March 22, 1960  A. A. ANDERSON  2,929,406
BALL TYPE VALVE
Filed May 6, 1957
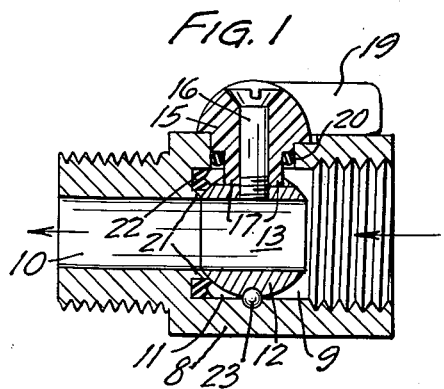
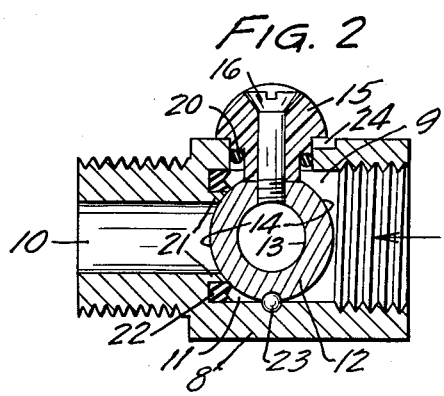
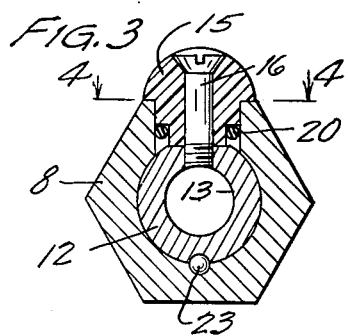
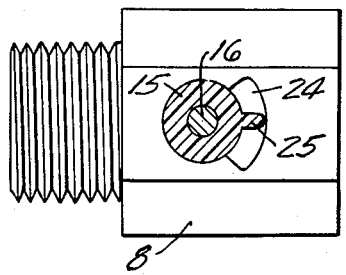
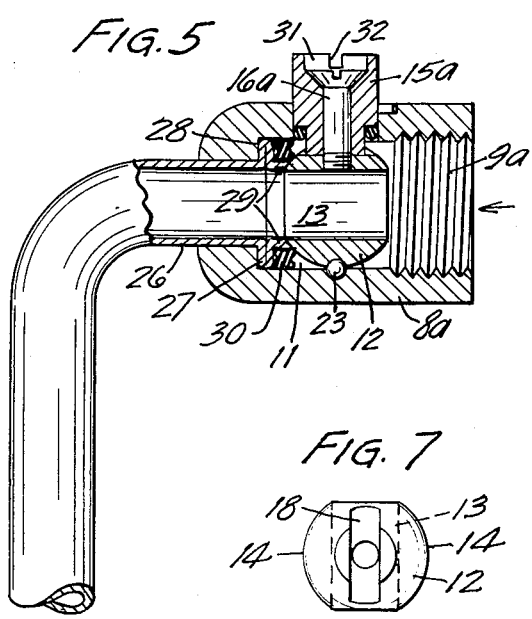
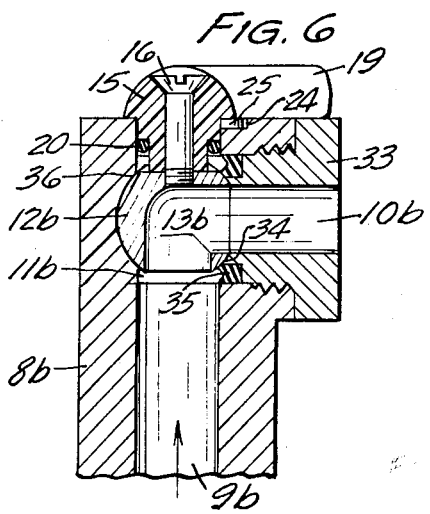
INVENTOR
ARTHUR A. ANDERSON
BY John E. Stryker
ATTORNEY

United States Patent Office 2,929,406
Patented Mar. 22, 1960

2,929,406

BALL TYPE VALVE

Arthur A. Anderson, St. Paul, Minn., assignor to The Specialty Mfg. Co., St. Paul, Minn., a corporation of Minnesota Application May 6, 1957, Serial No. 657,396

7 Claims. (Cl. 137—615)

This invention relates to improvements in valves of the ball type and has for one of its principal objects to provide such a valve with a simplified body structure containing a minimum number of movable elements and coacting pressure seal members whereby a more compact, less expensive valve is obtained without sacrificing quality or reliability in operation.

A further object is to provide a valve of the class described wherein the frictional resistance to the turning of the ball valve member and resulting wear on the pressure sealing and other bearing members and moving parts is minimized.

A particular object is to simplify the construction of a ball valve by eliminating the usual seal at the inlet side of the ball member and retaining it in coacting relation to a pressure seal ring at its outlet side by means of a simple detachable stem extending to the exterior of the valve body.

Another object is to provide a simplified valve of the character described having a ball valve member formed with an angular or elbow-shaped flow passage for connecting angularly disposed inlet and outlet passages.

A still further object is to provide a ball valve which is adapted to be embodied in a small fitting having a swivel connection to an end of a tube or other more or less flexible conduit and having a threaded end adapted to be connected to a rigid pipe or fitting.

My invention also includes certain other novel features of construction which will be more fully pointed out in the following specification and claims.

Referring to the accompanying drawing which illustrates, by way of example and not for the purpose of limitation, a preferred form and two modifications of my invention:

Figure 1 is a vertical sectional view showing one of my improved valves with the flow passage open;

Fig. 2 is a similar vertical sectional view, but showing the valve in the closed position;

Fig. 3 is a central vertical cross sectional view of the valve in the open position shown in Fig. 1;

Fig. 4 is a part plan view and part horizontal sectional view taken on the line 4—4 of Fig. 3;

Fig. 5 is a vertical sectional view showing a modification of the invention as embodied in a swivel fitting connected to the end of a tube;

Fig. 6 is a vertical sectional view showing a modification of the invention as applied to an angle valve, and Fig. 7 is a top plan view showing details of the ball member of Figs. 1–5.

Referring to Figs. 1–4, the valve has a tubular body 8 formed with an inlet passage 9 and an outlet passage 10 extending in axial alignment one with the other. Interposed between these passages is a chamber 11 containing a ball valve member 12. A flow passage 13 is formed in the member 12 to establish flow between the inlet passage 9 and the outlet passage 10 when the valve is in an open position, e.g., as in Fig. 1. At opposite sides of the passage 13, the member 12 has barrier wall portions 14 of spherical form which interrupt the flow between passages 9 and 10 when the valve is in the closed position indicated in Fig. 2.

A stem 15 is detachably connected to the ball member 12 and fits in a suitable bearing opening formed in the body 8. As shown, the stem 15 is secured to the ball member 12 by means of a screw 16 extending axially through the stem and having a threaded connection with the ball member. At its lower end, the stem 15 is fromed with a pair of projecting lugs 17 which engage the ball member in a transversely extending kerf 18 formed in the upper surface of this member so that turning movement of the stem is transmitted to the ball member. The latter may be rotated about an axis which extends through the center of the ball member and either at a right angle or at a suitable oblique angle to the axes of the passages 9 and 10. A handle member 19 may be formed integrally with the stem 15 to facilitate turning it. To seal the connection between the stem and body 8, a compressible sealing ring 20 is provided at the lower side of a shoulder formed on the stem. An O ring of common type may be used as the ring 20.

Surrounding the inner end of the outlet passage 10 is an annular contact member 21 of unyielding material adapted to slidably engage the spherical surface of the ball member 12. The member 21 may be an integral part of the body 8 and, preferably, has a narrow annular spherical surface for contact with the ball member 12. Confined in the chamber 11 at the outer periphery of the contact member 21 is a flexible compressible sealing ring 22. This ring makes sealing contact with ball member 12 when under fluid pressure. It is confined in an annular recess in the chamber 11 and is, preferably, rectangular in cross section, except that its surface exposed to pressure in the chamber 11 is formed with a shallow recess to increase the expansion of the ring toward the ball member when under pressure.

Stem 15 may be short with a short bearing, as shown, so that the ball member 12 is free for limited movement to and from the annular contact member 21 and pressure seal ring 22. For some installations, but not all, it is desirable to limit this movement by providing a bearing for the member 12 at the side opposite the stem 13 and in axial alignment therewith. This bearing may comprise a ball 23 fitting loosely in registering, semi-spherical recesses formed in the body 8 and ball member 12, respectively. Suitable means are provided for limiting the rotary movement of the stem and ball member 12. As best shown in Fig. 4, this limiting means comprises an arcuate recess 24 formed in the upper surface of the valve body 8 and a lug 25 projecting from the stem 15 for arcuate movement in the recess 24.

Inlet passage 9 is large enough in diameter to permit the insertion and withdrawal of the ball member 12 through this passage. The screw 16 is removed to permit the withdrawal of the stem 15. Withdrawal of the stem frees the member 12 for removal through the inlet passage 9. Where the ball 23 is provided, this removal of the member 12 requires slight rolling or angular turning movement of the member 12 to disengage it from the ball 23. Assembly of the valve merely requires the insertion of the member 12 through passage 9 and the attachment of stem 15 by means of the screw 16.

When the valve is in its closed position shown in Fig. 2, fluid pressure in chamber 11 causes compression of the body of the ring 22 and extension of the annular corner portion of this ring against the barrier surface of the member 12 to seal off the outlet passage. Such pressure on the member 12 insures firm contact between this member and annular contact member 21. The ring 22 is thereby prevented from being forced into the outlet passage 10. As hereinafter more fully pointed out, pressure of the ball member 12 on the spherical surface of the contact member 21 continues as the valve is opened so that there is no damage to or displacement of the ring 22. This ring and the similarly located sealing rings in the modified valves hereinafter described are constructed from an elastic material such as rubber or rubber-like material of suitable durometer hardness.

Referring to the modification of my invention shown in Fig. 5, a valve body 8a has a swivel connection with a tube 26 which forms the outlet passage. The connection between the body 8a and tube 26 may comprise an annular flange 27 projecting from the tube 26 in sliding engagement with an annular shoulder 28 formed in the body 8a. At its inner extremity the tube 26 is formed with an annular contact member 29 having a substantially spherical surface for sliding engagement with the periphery of the ball member 12. Confined in an annular recess formed in the chamber 11 around the outer periphery of the member 29 and at the inner side of the flange 27 is a flexible, elastic and compressible sealing ring 30 of rubber or rubber-like material. This ring is of the type known as a quad ring having rounded corner portions which protrude. One of these corner portions makes sealing contact with the ball member 12 when the ring is under pressure.

A stem 15a generally similar to the stem 15 is provided for the modification shown in Fig. 5. This stem is secured to the ball member 12 by a screw 16a and the head of the screw 16a is preferably counter-sunk in a recess defined by an annular flange 31 formed on the upper end of the stem. A cross kerf 32 is formed in the flange 31 to receive a tool for turning the stem and connected member 12. At the inlet end of the body 8a it is threaded for connection to a threaded pipe or fitting. Thus the valve body 8a may be connected to another conduit member merely by aligning the members to be connected and turning the body 8a about the axis of the inlet passage formed by the tube 26. To assemble the tube 26 in the body 8a before the stem 15a, member 12 and sealing ring 30 are assembled with the body 8a, the tube 26 is inserted through the passages 9a, chamber 11 and aligned opening to seat the flange 27 on the shoulder 28. Tube 26 must be substantially straight for assembly in the body 8a and may be thereafter bent to the desired shape exteriorly of the body 8a.

In the modification of my invention shown in Fig. 6, a valve body 8b is formed with an inlet passage 9b extending at an angle to an outlet passage 10b. At the junction of these passages, a chamber 11b is provided for a ball valve member 12b adapted to be rotated about an axis which is substantially at a right angle to the axis of the outlet passage 10b. A flow passage 13b of elbow-shape is formed in the valve member 12b and this member is detachably connected to the stem 15 by means of a screw 16. An O-ring seal 20 encircles the stem 15 as in the valve shown in Figs. 1–4. This stem also carries a handle 19 and its turning movement relative to the body 8b is limited by a lug 25 fitting in an arcuate groove 24, as indicated in Fig. 4.

Outlet passage 10b is formed in a threaded member 33 having a projecting annular contact member 34 for sliding engagement with the periphery of the ball member 12b. A sealing ring 35 of compressible elastic material (like the ring 22) encircles the member 34 and is subject to the fluid pressure in the chamber 11b containing the member 12b. Chamber 11b has a spherical wall portion 36 disposed for sliding contact with the periphery of the ball member 12b to retain this member against movement upward and away from the ring 35 and annular member 34.

The ring 35 functions to seal the joint between the valve body and ball member 12b when under pressure, as in the case of the rings 22 and 30 of the other modifications of the invention. However, ring 35 performs the further function of sealing the joint between the threaded member 33 and valve body 8b. Valve member 12b, like the member 12, has a barrier wall portion adapted to cut off flow from the passage 9b to the passage 10b when the valve is turned to the off position. To remove the ball member 12b from the chamber 11b, the screw 16 is detached and removed together with the stem 15. The threaded member 33 is also removed from the valve body 8b, together with the sealing ring 35. This frees ball member 12b for removal through the opening in the valve body 8b left by the threaded member 33. It will be evident that the inlet passage 9b may be extended at various angles relative to the outlet passage 10b and that the angle of the passage 13b may be modified to correspond to the angular relationship of the other passages.

My sealing rings for contact with the outlet side of the ball valve members 12 or 12b are made of a rubber or rubber-like material of durometer hardness within the range 50 to 90 durometer test. This elastic material, being compressible and expansible under fluid pressures within the range commonly provided in fluid supply systems, has distinct advantages in insuring a good seal when the valve is closed. Heretofore, however, it has not been feasible to use such sealing rings in a ball type valve because of the difficulties caused by the tendency of the relatively soft rings to protrude into the flow passage under the changes in pressure created when the valve is moved to and from its closed position. If permitted to protrude into the flow passage, the ring is either destroyed or displaced. This is known as "blow by" of the seal. Selection of an elastic ring best suited for a particular situation will depend on the fluid pressures to be controlled. Generally speaking, the higher pressures will require rings of hardness within the upper range of 70 to 90 durometer and when fluids under relatively low pressures are to be controlled, the softer rings, within the range 50–70, will be found most satisfactory.

According to the present invention, I prevent such "blow by" of the relatively soft sealing ring by confining it in an annular recess defined by concentric, substantially cylindrical walls one of which comprises the outer surface of an annular contact member surrounding the outlet passage. A narrow substantially spherical surface of this contact member conforms to the barrier wall of the movable valve member to prevent loss or destruction of the sealing ring as the edge of the surface defining the flow passage in the barrier wall moves across the ring. Only a feather edge comprising a corner portion of the ring is thereby permitted to protrude into the flow passage in the movable valve member. This edge portion of the ring is compressed and retracted to make sealing contact with the barrier wall when the valve is closed.

It should be particularly noted that in this valve close mechanical confinement of the ball in all directions, such as is the case in present commercial ball valves, is neither necessary nor desirable. Because the only consequential resistance to the turning of the ball element is that caused by fluid pressure impelling the barrier surface of the ball against the spherical surface of the outlet and its related seal, it is obvious that a handle of only very short moment arm is required to operate the valve.

Each of the several forms of my improved valve are characterized by their simplicity, compactness, low cost and ease of operation. A number of the parts of ordinary ball valves have been eliminated. These include all packing glands of the screw threaded type which cause varying frictional resistance to the turning of the valve stem. Also eliminated are the sealing means and backing rings usually employed at the inlet side of the ball valve members. By eliminating such seals and packing glands, I greatly reduce the frictional resistance to the turning of the valve between its on and off positions. The force required to turn the valve is further reduced by permitting the ball valve member to move to a position in slightly spaced relation to the unyielding contact members 21 or 29 or 34 when the ball valve member is in open or partially open positions.

I claim:

1. A valve comprising, a tubular body having a chamber and inlet and outlet passages extending from said chamber, a valve member movably mounted in said chamber and formed with a flow passage for placing said inlet passage in communication with said outlet passage when the valve member is in an open position and an exteriorly substantially spherical barrier wall portion adapted to cut off flow between said inlet and outlet passages when the valve member is in a closed position, an annular rigidly supported contact member of unyielding material having a circular periphery surrounding the inner end of said outlet passage for sliding contact with the exterior surface of the barrier wall portion of said valve member, a flexible and compressible sealing ring confined in said chamber at the outer periphery of said contact member, the outer and inner peripheries of said sealing ring being in continuous contact with inner and outer surfaces respectively of said chamber and contact member, and said sealing ring having an annular edge portion of reduced thickness disposed to project adjacent to said contact member for sealing engagement with said valve member, and a stem extending to the exterior of said body for turning said valve member about an axis extending through the center of the sphere defined by the spherical exterior surface of said barrier wall member and parallel to the plane of said circular periphery of said contact member, said stem being operable to move said barrier wall portion across said sealing ring during the opening and closing movement of said valve member and said valve member being subject to fluid pressure from said inlet passage when the valve is in fully closed position to force said barrier wall against said annular contact member, and to compress said sealing ring against said barrier wall, chamber wall and annular contact member, and said sealing ring being under substantially no compression when the valve is in open position.

2. A valve in accordance with claim 1 wherein said annular edge portion of reduced thickness has a substantially spherical contact surface for sealing engagement with said valve member.

3. A valve in accordance with claim 1 wherein said sealing ring is substantially quadrangular in cross sectional shape and said annular edge portion of reduced thickness comprises one of the corner portions of said ring.

4. A valve in accordance with claim 1 wherein said sealing ring is confined between concentric, substantially cylindrical surfaces at its outer and inner peripheries, the axes of said surfaces being at right angles to the axis of rotation of said valve member.

5. A valve in accordance with claim 1 wherein the contact surface of said annular contact member is substantially spherical and of substantial width.

6. A valve in accordance with claim 1 wherein said sealing ring is composed of a rubber or rubber-like material having durometer hardness within the range 50–90 inclusive.

7. A valve comprising, a tubular body having a chamber and inlet and outlet passages extending from said chamber, said outlet passage comprising a tube having a swivel connection with said body, a valve member rotatably mounted in said chamber and formed with a flow passage for placing said inlet passage in communication with said outlet passage, said valve member having an exteriorly spherical barrier wall portion adapted to cut off flow between said inlet and outlet passages, a cylindrical contact member projecting from the inner end of said tube for sliding contact with the exterior surface of said barrier wall portion, said chamber having a cylindrical wall portion spaced outwardly from the outer periphery of said cylindrical contact member; an annular flexible and compressible sealing ring of substantially quadrangular shape in cross section filling the space between said cylindrical wall portion and the annular contact member, in continuous contact with the outer periphery of said contact member, with said wall portion of the chamber and with the barrier wall portion of said valve member, and being compressible under fluid pressure from said inlet passage when the valve is closed to seal both the swivel connection between said tube and body and the joint between said wall portion of the chamber and said barrier wall portion of the valve member; and a valve stem extending from said valve member to the exterior of said body and operatively connected to said valve member for turning it about an axis extending through the center of the sphere defined by the exterior spherical surface of said barrier wall member.

References Cited in the file of this patent

UNITED STATES PATENTS

| | | |
|---|---|---|
| 1,784,381 | O'Stroske | Dec. 9, 1930 |
| 2,349,978 | Miller | May 30, 1944 |
| 2,485,915 | Parker | Oct. 25, 1949 |
| 2,645,448 | Bugg | July 14, 1953 |
| 2,673,062 | Cornelius | Mar. 23, 1954 |
| 2,792,196 | Clade | May 14, 1957 |
| 2,841,429 | McCuistion | July 1, 1958 |

FOREIGN PATENTS

| | | |
|---|---|---|
| 710,360 | France | June 8, 1931 |
| 744,193 | Germany | Jan. 12, 1944 |